United States Patent
Hegde et al.

(10) Patent No.: US 10,181,102 B2
(45) Date of Patent: Jan. 15, 2019

(54) COMPUTER IMPLEMENTED CLASSIFICATION SYSTEM AND METHOD

(71) Applicant: Tata Consultancy Services Limited, Mumbai (IN)

(72) Inventors: Dhiraj Nagaraja Hegde, Bangalore (IN); Izzatbir Singh, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 783 days.

(21) Appl. No.: 14/602,423

(22) Filed: Jan. 22, 2015

(65) Prior Publication Data
US 2016/0217386 A1    Jul. 28, 2016

(51) Int. Cl.
G06F 15/18    (2006.01)
G06N 99/00    (2010.01)

(52) U.S. Cl.
CPC .................. *G06N 99/005* (2013.01)

(58) Field of Classification Search
CPC .............................. G06T 9/00; G06K 9/00442
USPC ...................................... 706/15, 45
See application file for complete search history.

(56) References Cited

U.S. PATENT DOCUMENTS

| | | | |
|---|---|---|---|
| 2002/0059151 A1* | 5/2002 | Soufian | H01J 49/0036 706/15 |
| 2010/0160791 A1* | 6/2010 | Liu | A61B 5/0059 600/476 |
| 2013/0308872 A1* | 11/2013 | Dhand | G06T 9/00 382/233 |
| 2014/0132799 A1* | 5/2014 | Kim | H04N 1/2166 348/231.2 |
| 2014/0201126 A1 | 7/2014 | Zadeh et al. | |

FOREIGN PATENT DOCUMENTS

CN    102750309    10/2012

OTHER PUBLICATIONS

Caruana, G., et al., "A MapReduce based parallel SVM for large scale spam filtering", Fuzzy Systems and Knowledge Discovery (FSKD), 2011 Eighth International Conference on, vol. 4, pp. 2659-2662, Jul. 26-28, 2011, (Jul. 26, 2011), 2659-2662.

Xu, Ke, et al., "A MapReduce based Parallel SVM for Email Classification", Journal of Networks, vol. 9, No. 6, June 2014, 1640-1647, (Jun. 2014), 1640-1647.

\* cited by examiner

*Primary Examiner* — David R Vincent
(74) *Attorney, Agent, or Firm* — Schwegman Lundberg & Woessner, P.A.

(57) ABSTRACT

Computer implemented system and method for classifying users is provided. The method includes obtaining a data set from one or more sources corresponding to one or more users; segmenting the data set into segments, each segment comprising one or more data points, wherein each data point is specific and unique to a user; identifying difficult regions from one or more segments; computing a standard deviation of distances between the data points within each of the identified difficult regions for each of the identified difficult regions; selecting a radial basis function (RBF) kernel based on the standard deviation computed for each of the identified difficult regions; generating a support vector machine model on each of the identified difficult regions based on the selected RBF kernel to obtain a hyper plane comprising support vectors and weight assigned to the vectors; and classifying the users into a category based on the hyper plane.

11 Claims, 10 Drawing Sheets

| DATA SET 502 | ACCURACY USING GRID SEARCH (CONVENTIONAL METHOD) 504 | ACCURACY USING ESTIMATED SIGMA (PROPOSED METHOD) 506 | DIFFERENCE 508 |
|---|---|---|---|
| 1 | 92.14285714 | 92.14285714 | 0.0000000 |
| 2 | 88.71428571 | 89 | 0.2857143 |
| 3 | 96.71428571 | 96.57142 | -0.1428657 |
| 4 | 94.28571429 | 94.14285714 | -0.1428571 |
| 5 | 99.2 | 99 | -0.2000000 |
| 6 | 99.33333 | 98.93333333 | -0.3999967 |

COMPUTER IMPLEMENTED CLASSIFICATION SYSTEM AND METHOD

BACKGROUND

Technical Field

The embodiments herein generally relate to classification systems, and, more particularly, to a computer implemented classification system and method for classifying one or more users.

Description of the Related Art

Technology has developed exponentially with usage of electronics and computer systems. With the development of technology, the quantity of data has significantly grown. With the increasing amount of data processing, it has been difficult to analyze and classify such large data sets. Efficient computation, and analyses of the large data sets are increasingly prevalent in recent years. A key to achieve this is by executing parallel algorithms and classify them or one or more users associated with the data sets to meet the performance requirements in such a large data set analyses. Data mining is a process of identifying new patterns from the large data sets involving, database systems, statistics, and machine learning.

Support Vector Machines (SVMs) are supervised machine learning models used for classification and regression purpose. Theoretically they are one of the best known linear classifiers. However, (a) all problems are not linearly separable, hence a suitable Kernel has to be chosen (or selected) to map the classification problem or to be used in support vector machine classification to a linearly separable feature space, and (b) the training time required for SVM grows dramatically with the size of the training data set. Accordingly, there remains a need for a classification system and method to analyse the data set and classify one or more users corresponding to the data sets.

SUMMARY

In one aspect, a computer implemented method for classifying one or more users is provided. The computer implemented method comprising obtaining a data set from one or more sources, wherein the data set comprises information corresponding to one or more users; segmenting the data set into one or more segments using a decision tree, each segment comprising one or more data points, wherein each data point is specific and unique to a user, and wherein the decision tree comprises one or more nodes, each node comprising at least one data point; identifying a plurality of difficult regions from one or more segments to obtain one or more identified difficult regions, wherein each of the one or more identified difficult regions comprises a set of data points; computing a standard deviation of distances between the set of data points within each of the one or more identified difficult regions for each of the one or more identified difficult regions; selecting a radial basis function (RBF) kernel based on the standard deviation computed for each of the one or more identified difficult regions to obtain a selected RBF kernel; generating a support vector machine model on each of the one or more identified difficult regions based on the selected RBF kernel to obtain a hyper plane comprising a plurality of support vectors and weight assigned to each of the plurality of support vectors; and classifying the one or more users into at least one category based on the hyper plane.

The one or more difficult regions are identified based on a purity level and number of data points in at least one node of the decision tree. The standard deviation is computed in accordance with an equation:

$$K(X_i, X) = \exp\left(-\frac{\|X_i - X_j\|^2}{2\sigma^2}\right),$$

wherein $K(X_i,X)$ is a kernel function, wherein $\sigma$ is a value in the RBF kernel, and where $X_i$ and $X_j$ are data points.

The hyper plane is obtained in accordance with an equation:

$$f(X) = \sum_{\{i \in support\ vectors\}} \alpha_i y_i K(X_i, X) + b,$$

where i ranges from 1 to n, where $\alpha_i$ is the weight assigned to each of said plurality of support vectors 'i', and b is the bias. The one or more sources is selected from a group comprising a telecommunication industry, a financial institution, a medical institution, a retail industry, and a combination thereof. The at least one category is selected from a group comprising a credit defaulter, a health disease, a fraudulent detection, and a combination thereof.

In another aspect, a computer implemented system for classifying one or more users is provided. The computer implemented system comprising a hardware processor; a memory that stores instructions and a database, wherein the database comprises a data set obtained from one or more sources, wherein the data set comprises information corresponding to one or more users, and wherein the hardware processor is configured by the instructions to execute: a segmentation module that segments the data set into one or more segments using a decision tree, each of the one or more segments comprising one or more data points, wherein each data point is specific and unique to a user, and wherein the decision tree comprises one or more nodes, each node comprising at least one data point; a difficult region identification module that identifies a plurality of difficult regions from the one or more segments to obtain one or more identified difficult regions, wherein each of the one or more identified difficult regions comprises a set of data points; a standard deviation computation module that computes a standard deviation of distances between the set of data points within each of the one or more identified difficult regions for each of the one or more identified difficult regions; a radial basis function selection module that selects a radial basis function (RBF) kernel based on the standard deviation computed for each of the one or more identified difficult regions to obtain a selected RBF kernel; a support vector machine model generation module that generates a support vector machine model on each of the one or more identified difficult regions based on the selected RBF kernel to obtain a hyper plane comprising a plurality of support vectors and weight assigned to each of the plurality of support vectors; and a classification module that classifies said one or more users into at least one category based on the hyper plane comprising the plurality of support vectors and weight assigned to each of the plurality of support vectors.

The one or more difficult regions are identified based on a purity level and number of data points in at least one node of the decision tree. The standard deviation is computed in accordance with an equation:

$$K(X_i, X) = \exp\left(-\frac{\|X_i - X_j\|^2}{2\sigma^2}\right),$$

wherein $K(X_i,X)$ is a kernel function, where $\sigma$ is a value in the RBF kernel, and where $X_i$ and $X_j$ are data points. The hyper plane is obtained in accordance with an equation:

$$f(X) = \sum_{\{i \in suppor\ vectors\}} \alpha_i y_i K(X_i, X) + b,$$

where i ranges from 1 to n, where $\alpha_i$ is said weight assigned to each of the plurality of support vectors 'i', and b is the bias.

In yet another aspect, one or more non-transitory machine readable information storage mediums comprising one or more instructions, which when executed by one or more hardware processor causes classifying one or more users by performing the step of: obtaining a data set from one or more sources, wherein the data set comprises information corresponding to one or more users; segmenting the data set into one or more segments using a decision tree, each segment comprising one or more data points, wherein each data point is specific and unique to a user, and wherein the decision tree comprises one or more nodes, each node comprising at least one data point; identifying a plurality of difficult regions from the one or more segments to obtain one or more identified difficult regions, wherein each of the one or more identified difficult regions comprises a set of data points; computing a standard deviation of distances between the set of data points within each of the one or more identified difficult regions for each of the one or more identified difficult regions; selecting a radial basis function (RBF) kernel based on the standard deviation computed for each of the one or more identified difficult regions to obtain a selected RBF kernel; generating a support vector machine model on each of the one or more identified difficult regions based on the selected RBF kernel to obtain a hyper plane comprising a plurality of support vectors and weight assigned to each of the plurality of support vectors; and classifying the one or more users into at least one category based on the hyper plane.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration. The summary is not intended to identify essential features of the claimed subject matter nor is it intended for use in determining or limiting the scope of the claimed subject matter. Changes and modifications may be made within the scope of the embodiments herein.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a classification system and method to classify one or more users into one or more categories. The embodiments herein achieve this by providing a computer implemented classification system and method for classifying one or users based on the data set obtained from one or more sources via one or more networks. The one or more networks may include, but not limited to, intranet, a local area network (LAN), a wide area network (WAN), the internet, a cloud computing device, and/or combinations thereof. The data set comprises information corresponding to the one or more users. The data set is segmented into one or more segments using a decision tree, each segment comprising one or more data points. Each data point is specific and unique to a user. One or more difficult regions are identified from the one or more segments to obtain one or more identified difficult regions. Each difficult region comprises a set of data points. A standard deviation of the distances between the set of data points within each of the one or more identified difficult regions is computed for each of the one or more identified difficult. A radial basis function (RBF) kernel is selected based on the standard deviation computed for each of the one or more identified difficult regions to obtain a selected RBF kernel, and a support vector machine model is generated on each of the one or more identified difficult regions based on the selected RBF kernel to obtain a hyper plane comprising a plurality of support vectors and weight assigned to each of the plurality of support vectors. Further, the one or more users are classified into one or more categories based on the hyper plane and the weight assigned to each of the plurality of support vectors. Referring now to the drawings, and more particularly to FIGS. 1 through 7, where similar reference characters denote corresponding features consistently throughout the figures, there are shown preferred embodiments and these embodiments are described in the context of the following exemplary system and/or method.

As used herein, the term "decision tree" refers to a decision support tool that uses a tree-like graph or model of decisions and possible consequences, including chance event outcomes, resource costs, and utility.

As used herein, the term "Support Vector Machine" refers to a supervised learning model used for classification and regression purpose. SVMs are maximal margin classifiers. More formally, a support vector machine constructs a hyper plane or set of hyper planes in a high- or infinite-dimensional space, which can be used for classification, regression, or other tasks. Intuitively, a good separation is achieved by the hyper plane that has the largest distance to the nearest training data point of any class (so-called functional margin), since in general the larger the margin the lower the generalization error of the classifier.

As used herein, the term "RBF Kernel" refers to a radial basis function (Gaussian) kernel, or a RBF kernel, used in support vector machine classification.

As used herein, the term "map reduce framework" refers to a model (or an implementation) for processing and generating large data sets with a parallel, distributed algorithm on a cluster. The framework comprises (i) one or more mappers that perform filtering and sorting (such as sorting one or more user information into queues, one queue for each user information) and (ii) one or more reducers that perform a summary operation (such as counting the number of users based on the user information in each queue, frequencies, etc.).

Figure 1:
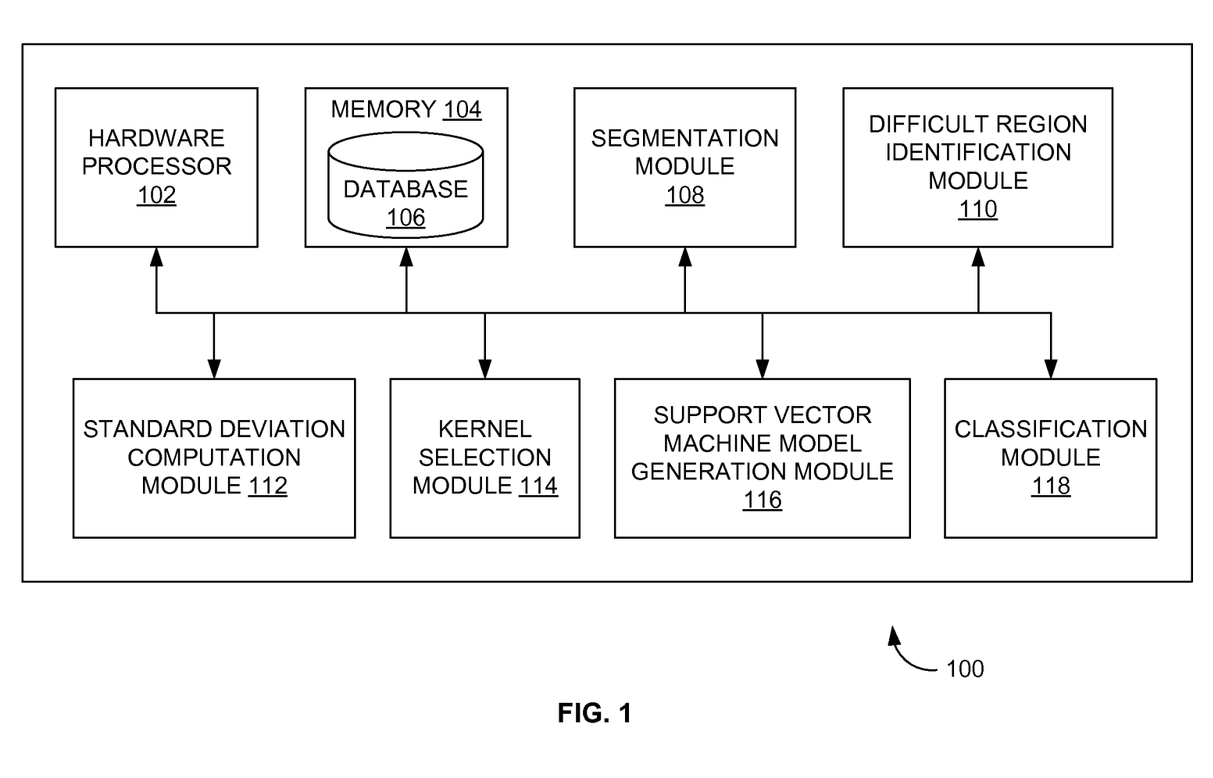
FIG. 1 is a block diagram of a classification system according to an embodiment of the present disclosure.

FIG. 1 is a block diagram of a classification system 100 according to an embodiment of the present disclosure. The classification system 100 includes a hardware processor 102, a memory 104 storing instructions and a database 106, a segmentation module 108, a difficult region identification module 110, a standard deviation computation module 112, a kernel selection module 114, a support vector machine model generation module 116, a hyper plane computation module 118, and a classification module 120. The hardware processor 102 is configured by the instructions to execute the segmentation module 108, the difficult region identification module 110, the standard deviation computation module 112, the kernel selection module 114, the support vector machine model generation module 116, and the classification module 118. The database 106 stores one or more datasets obtained from one or more sources. The one or more datasets comprises information corresponding to one or more users. The information comprises, but not limited to financial data, personal data, medical records, subscription and usage of one or more services, and a combination thereof, etc. The one or more sources is selected from a group comprising, but not limited to, one or more telecommunication industries, one or more medical institutions, one or more financial institutions, and one or more retailers, etc. The segmentation module 108 segments the dataset into one or more segments (or one or more data points) using a decision tree. Each segment comprises one or more data points. Each of the data point is specific and unique to a user. For example, a first data point is specific and unique to a first user, and a second data point is specific and unique to a second user. The decision tree comprises one or more nodes, where each node comprises at least one data point.

The difficult region identification module 110 identifies a plurality of difficult regions from the one or more segments (or from segmented data points) to obtain one or more identified difficult regions. Each of the one or more identified difficult regions comprises a set of data points. The standard deviation computation module 112 computes a standard deviation for each of the one or more identified difficult regions. The standard deviation is the distances between the set of data points within each of the one or more identified difficult regions. In other words, the standard deviation computation module 112 computes the standard deviation of distances between the set of data points within each of the one or more identified difficult regions for each of the one or more identified difficult regions. The kernel selection module 114 selects a radial basis function (RBF) kernel based on the standard deviation computed for each of the one or more identified difficult regions to obtain a selected RBF kernel. The support vector machine model generation module 116 generates a support vector machine (SVM) model on each of the one or more identified difficult regions based on the selected RBF kernel to obtain a hyper plane comprising a plurality of support vectors and weights assigned to each of the plurality of support vectors. In a preferred embodiment, the SVM models are generated using a cascade SVM model implemented using a Map Reduce framework. In another embodiment, the SVM models may be generated using any other framework or technique to obtain the plurality of support vectors. The plurality of support vectors comprises one or more positive support vectors, and one or more negative support vectors. The classification module 118 classifies the one or more users into one or more categories based on the hyper plane comprising one or more positive support vectors, and one or more negative support vectors. It is to be understood to a person having ordinary skill in the art that the embodiments described herein can also be implemented to classify one or more objects, specimens, and/or any other data set type.

The segmentation module 108, the difficult region identification module 110, the standard deviation computation module 112, the kernel selection module 114, the support vector machine model generation module 116, and the classification module 118 are implemented as a logically self-contained part of a software program that when executed perform the above method described herein. In another embodiment, the segmentation module 108, the difficult region identification module 110, the standard deviation computation module 112, the kernel selection module 114, the support vector machine model generation module 116, and the classification module 118 are implemented as a self-contained hardware component. The classification system 100 is selected from a group comprising a personal computer, a laptop, a palmtop, a smartphone, and/or any other computing device that is capable of implementing and executing the above modules and/or performing the methodology described herein.

Figure 2A:
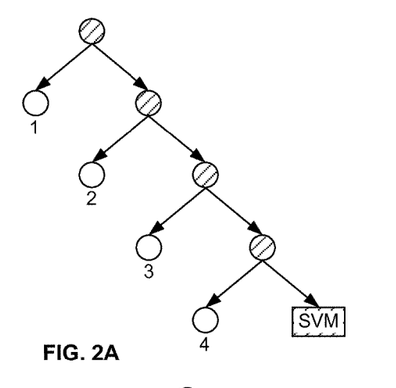
FIGS. 2A-2D illustrate a decision tree that represents segmentation of a dataset using a segmentation module of FIG. 1 according to an embodiment of the present disclosure.
Figure 2B:
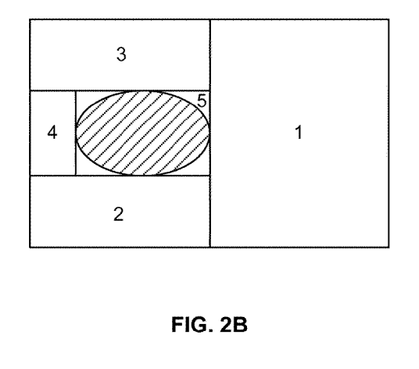
Figure 2C:
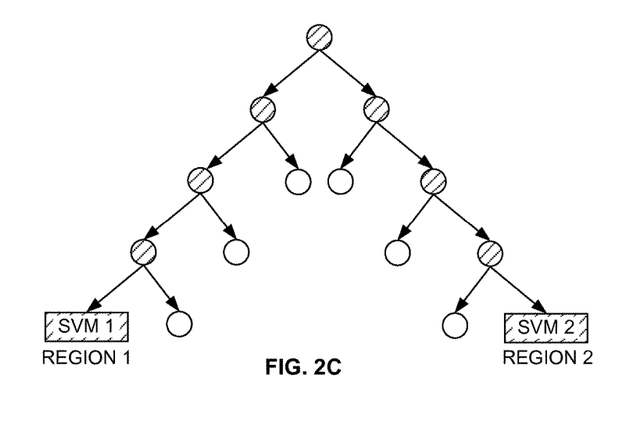
Figure 2D:
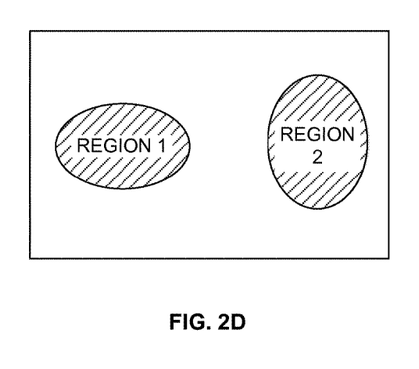

FIGS. 2A-2D, with reference to FIG. 1, illustrate a decision tree that represents segmentation of the dataset using the segmentation module 108 according to an embodiment of the present disclosure. More particularly, FIGS. 2A-2D illustrate the decision tree based on which one or more difficult regions are identified. By way of example, FIG. 2A-2B illustrates a decision tree with a single identified difficult region. Similarly, FIG. 2C-2D illustrates a decision tree SVM with more than one identified difficult regions. When the dataset is segmented, it is determined whether each of the segments has sufficient purity and data points. Purity is the percentage of the number of data points belonging to the different classes. For example, if there are 1000 data points falling to a particular node in the decision tree and of the 1000 points, 900 belonging to class label 1 and 100 belong to class label 2, then Purity is 90% for label 1. The required purity is predefined by a user depending on the ratio of the number of data points belonging to different labels. If required Purity is not met at minimum number of data points at the node of the decision tree, these regions or data points are identified as "difficult regions". This is illustrated in FIG. 2A, and FIG. 2C. For illustrations, a data set having only two features is considered, and hence can be depicted in two dimensional space. The plot of this data set is on the left of the decision tree in FIGS. 2B and 2D. Each of the data points are either labelled 1 or 0. The data points with label 1 correspond to the shaded region in the plot and the data points with label 0 correspond to the unshaded region in the plot. The node in the decision tree with label 1 corresponds to the region 1 in the data set on the left of the decision tree. Similarly the label 2 corresponds to the region 2 in the data set on the left and so on.

Upon identifying the one or more difficult regions, a standard deviation is computed for each of the one or more identified difficult regions using the standard deviation computation module. A radial basis function (RBF) kernel is then selected based on the standard deviation computed for each of the one or more identified difficult regions to obtain a selected RBF kernel. The RBF kernel is selected based on a good sigma parameter and a cost parameter of the RBF Kernels.

The standard deviation is computed in accordance with the equation:

$$K(X_i, X) = \exp\left(-\frac{\|X_i - X_j\|^2}{2\sigma^2}\right),$$

where $K(X_i,X)$ is a kernel function, $X_i$, $X$ and $X_j$ are the data points, and $\sigma$ is the value in the RBF kernel.

In a preferred embodiment, consider the training data $T=\{<X_1,y_1,>, \ldots <X_n,y_n>\}$, where $X_i=<x_1, \ldots, x_n>$ is a set of features and $y_i \in \{+1, -1\}$ is its associated label. For example, in the context of credit defaulter prediction $X_i$ could represent the features of a customer and $y_i$ would represent whether the customer defaults or not.

Figure 3:
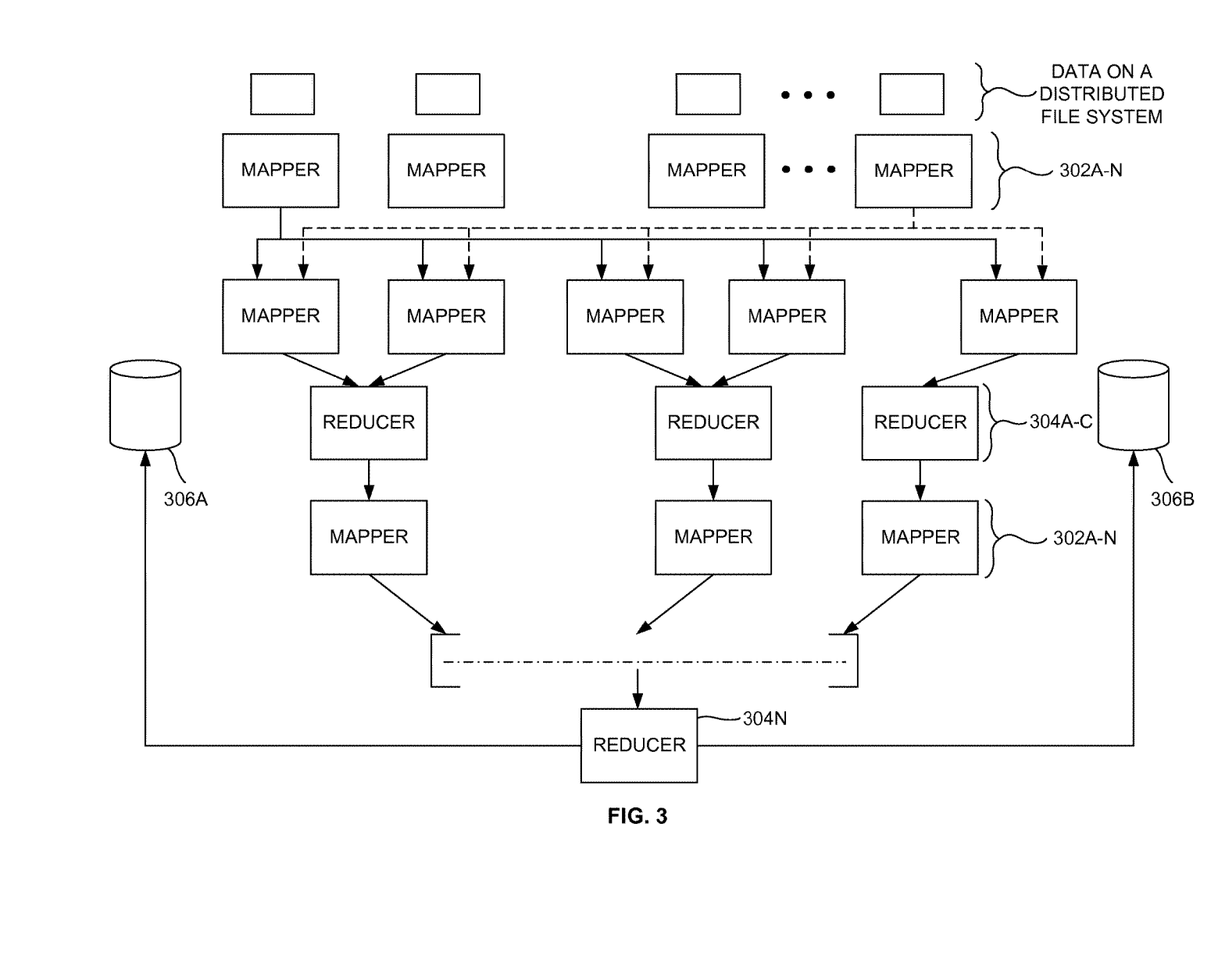
FIG. 3 illustrates a cascade SVM model implemented using a Map Reduce framework for generating a SVM model on each of one or more identified difficult regions based on a selected RBF kernel according to a preferred embodiment of the present disclosure.

FIG. 3, with reference to FIGS. 1 through 2B, illustrates a cascade SVM model implemented using a Map Reduce framework for generating a SVM model on each of the one or more identified difficult regions based on the selected RBF kernel according to a preferred embodiment of the present disclosure. More particularly, FIG. 3 illustrates the cascade SVM model implemented using the Map Reduce framework for obtaining a plurality of support vectors at a single reducer on a distributed file system. The SVM model is generated on each of the identified difficult regions using the data points falling into that region for training. Before initiating the cascade SVM model, a user decides the number of cascade layers required and the number of reducers available (e.g., one or more reducers 304A-N) in the map reduce framework. Assume 'L' is the number of cascade layers and 'K' is the number of reducers available. For each data point in one of the difficult regions, a random key is generated. If the number of reducers available is 'K', a number is generated between 1 and K. This number becomes the Key for the data point and the value in the Key Value pair becomes the data point itself.

As illustrated in FIG. 3, when the Map Reduce framework is implemented, each mapper (e.g., one or more mappers 302A-N) emits the generated Key Value pair. The map reduce framework comprises one or more distributed cache 306A-B that stores feedback points (e.g., feedback data points) which are further passed to the one or more reducers 304A-C. Each of the reducers 304A-C gathers all the data points which have the same key. Thus, each reducer has a set of support vectors (e.g., one or more support vectors). For all the support vectors which have been generated from the data set with key value say 'k', another key value is generated 'k/2', which is rounded off to the nearest larger integer. This now becomes the key and the value becomes the support vector. The above steps are repeated until all the data points arrive at a single reducer 304N. A SVM model is built or generated on the data points which arrive at the last reducer in the cascade.

The plurality of support vectors are obtained as an output at a reducer from the map reduce framework. The plurality of support vectors comprise of one or more positive support vectors, and one or more negative support vectors. The output also comprises weight assigned to each of the one or more positive support vectors, and the one or more negative support vectors. These support vectors are provided as feedback to a first layer by storing them in the one or more distributed caches (e.g., the distributed cache 306A-B).

A hyper plane is computed (or obtained) comprising the plurality of support vectors and the weight for each support vector. The hyper plane is computed in accordance with an equation:

$$f(X)=\Sigma_{(I \in suppor\ vectors)}\alpha_i y_i K(X_i,X)+b,$$

where $\alpha_i$ is the weight associated with a support vector and b is the bias.

The one or more users are classified into one or more categories using the hyper plane computed based on the plurality of support vectors and the weight for each support vector (e.g., using the classification module 120).

Figure 4A:
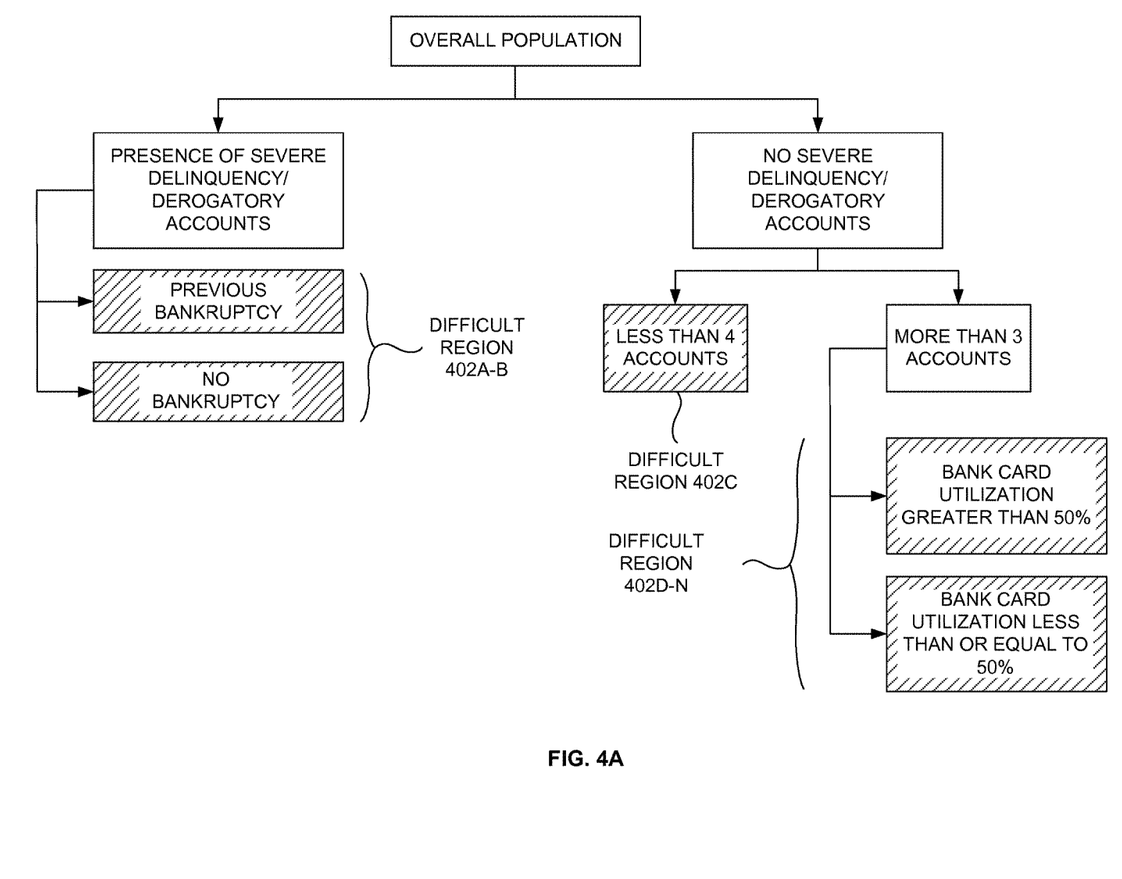
FIG. 4A-4B illustrate an exemplary view of the data set that is used for classifying one or more users using the classification system of FIG. 1 according to an embodiment of the present disclosure.
Figure 4B:
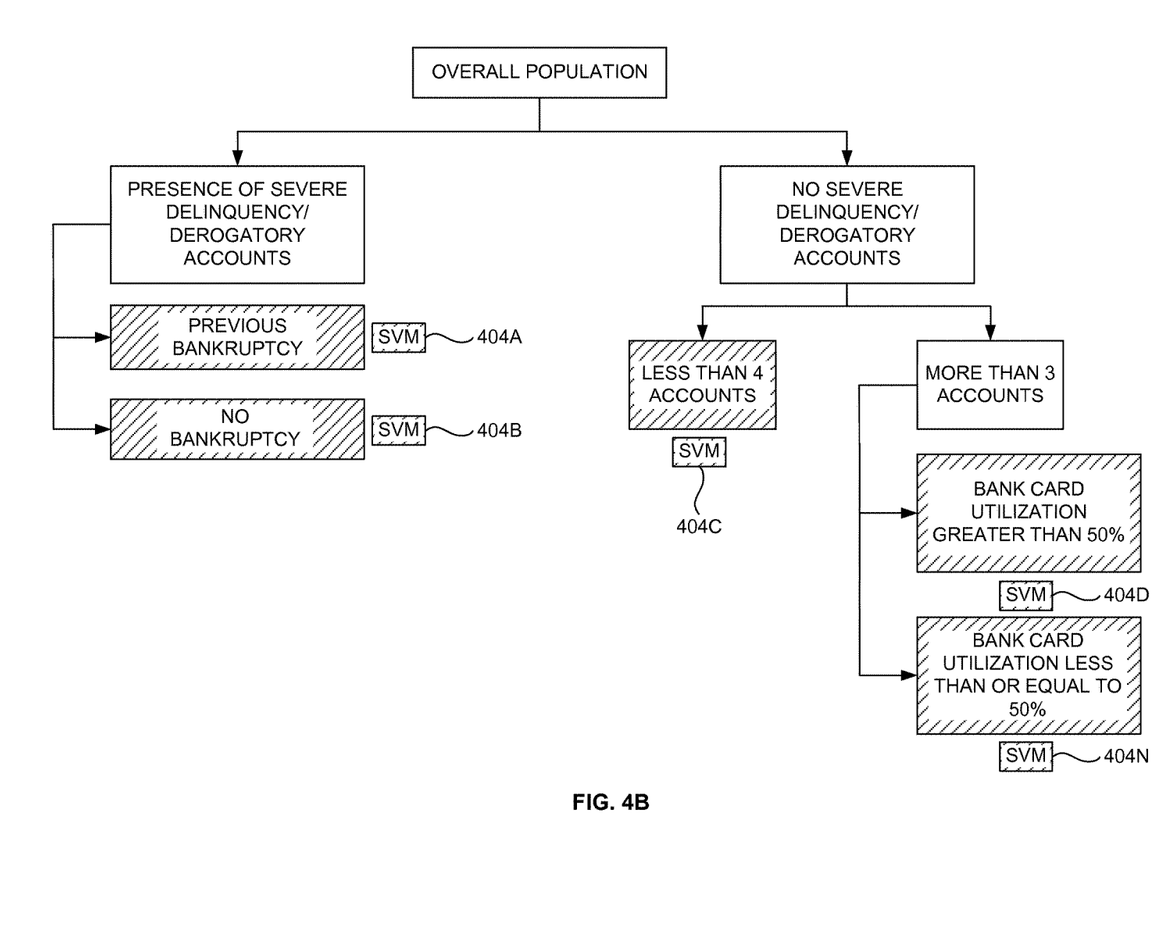

FIG. 4A-4B, with reference to FIGS. 1 through 3, illustrate an exemplary view of the data set that is used for classifying one or more users using the classification system 100 according to an embodiment of the present disclosure. More particularly, FIG. 4A-4B illustrates a credit default prediction using the classification system 100. Data set is segmented, and hence a decision tree SVM is implemented. By way of clarification, the different leaf nodes in the decision tree correspond to different sub-populations. SVM models are built for each of these sub-populations/segments (e.g., the shaded blocks as shown in FIGS. 4A-4B).

One or more difficult regions 402A-N are identified (e.g., the shaded blocks as shown in FIGS. 4A-4B). Thus, the overall population would be to segmented using the number of severely delinquent/derogatory accounts and generate SVM models on each population separately, optimizing the relationship of that characteristic to the risk prediction of the respective segment. A SVM model (e.g., one or more SVM models 404A-N) is generated on each of the difficult regions 402A-N (e.g., at each segment of the population) as shown in FIG. 4B. An advantage of the proposed embodiments is that, the proposed methodology and the classification system 100 does not require SVM models to be generated on one or more non-difficult regions. As described, credit default data provides natural sub-populations which need to be modeled differently. Hence by using a combination of Decision Trees and SVMs, the decision trees will be able to segment the data set into one or more data points and the SVMs when necessary will be applied to the different segments to score them. The advantage is that each of these SVM models can be built (or generated) independently in a distributed fashion, resulting in a small number of training sets. As the training set for each of the SVM is smaller, the training time is also reduced.

Figure 5:
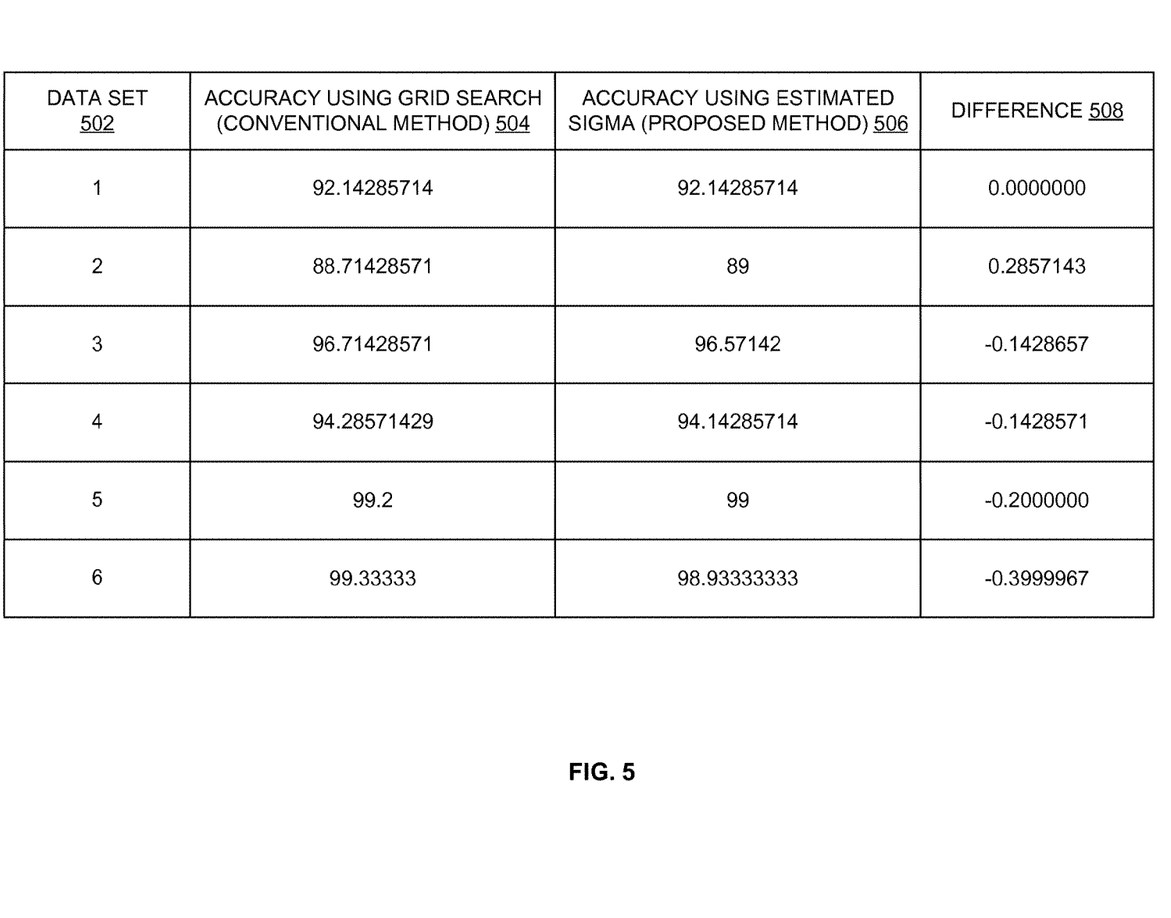
FIG. 5 is a table view illustrating one or more datasets that are simulated/generated and corresponding probability scores computed using (i) the conventional grid search method, and (ii) based on the estimated sigma value as computed using the proposed method as described herein.
Figure 6A:
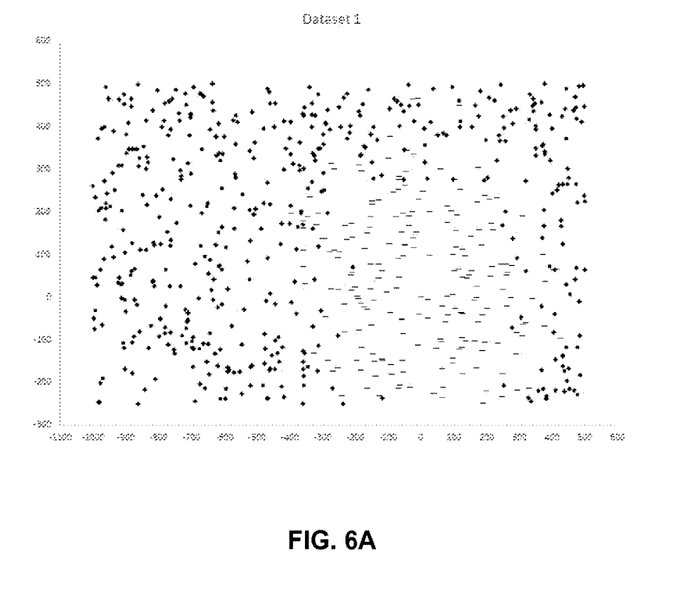
FIGS. 6A-6F illustrate a graphical representation of the hyper plane that comprises a plurality of support vectors according to an embodiment of the present disclosure.
Figure 6B:
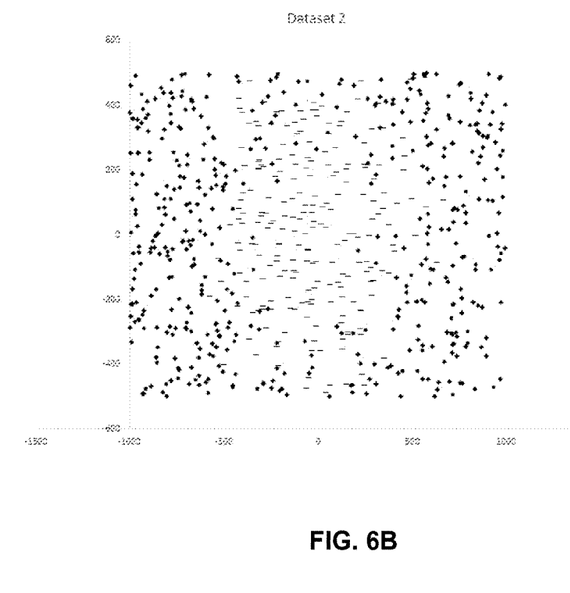
Figure 6C:
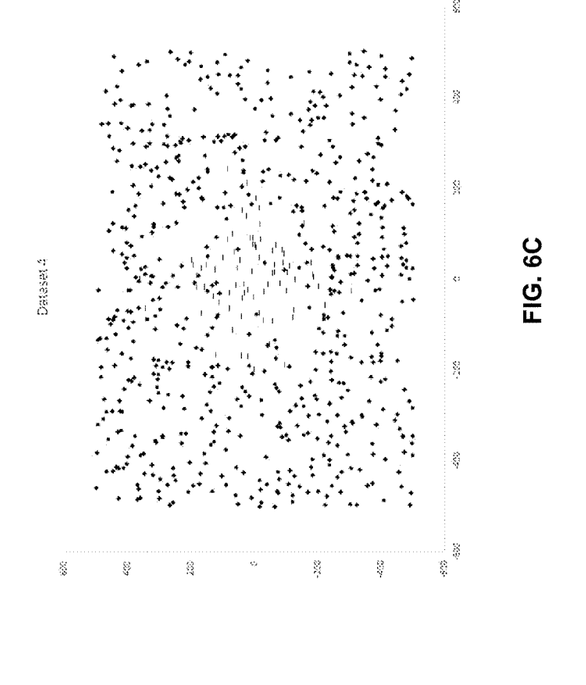
Figure 6D:
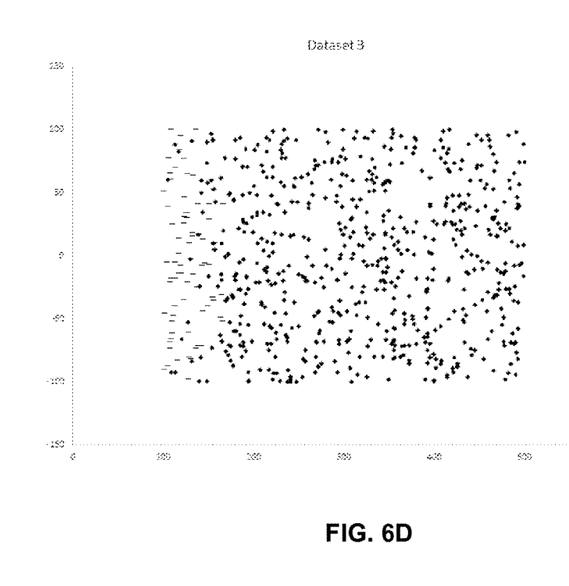
Figure 6E:
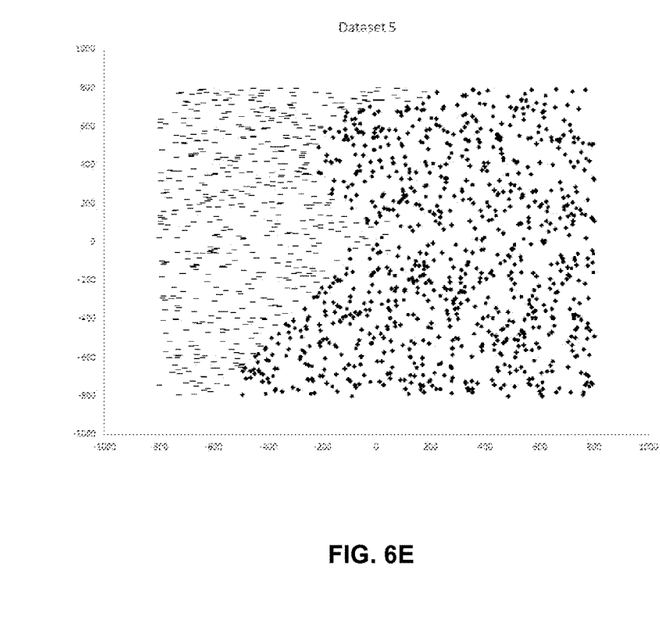
Figure 6F:
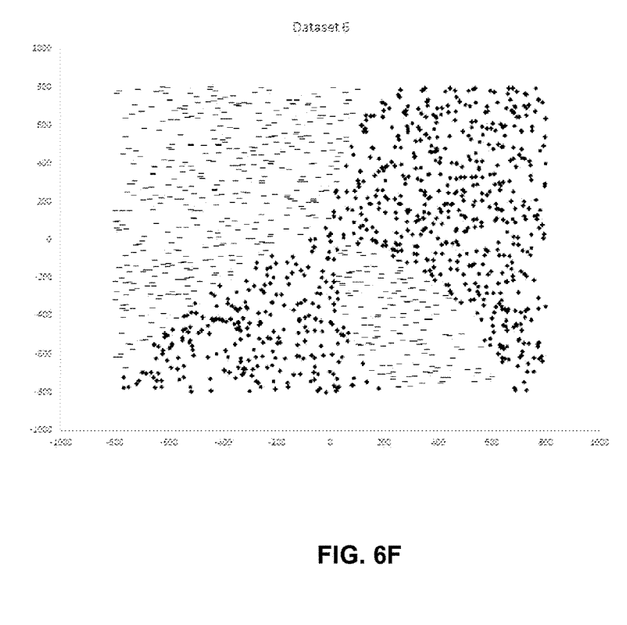

FIG. 5 is a table view illustrating one or more datasets that are simulated/generated and corresponding probability scores computed (i) using the conventional grid search method, and (ii) based on the estimated sigma value as computed using the proposed method as described herein. More particularly, the table view illustrates a difference between the conventional grid search method and the proposed method which uses the sigma value estimated for an optimal RBF kernel selection. The table view includes a data set field 502, an accuracy (or probability score) field 504 using grid search conventional method, an accuracy (or probability score) field 506 using the proposed method, and a difference field 508. The data set field 502 includes one or more data sets obtained from one or more sources. The accuracy field 504 includes one or more probability scores computed using grid search conventional method. The accuracy field 506 includes one or more probability score computed using the estimated sigma value in the RBF kernel of the proposed method described herein. The difference field 506 indicates a difference of the probability scores computed by the grid search conventional method and the proposed method described herein. As depicted in FIG. 5, it is evident from the above experimental results that the proposed method is based on an optimal selection of the sigma value which is used to select the RBF kernel and thus further reduces the overall time in training the data sets.

FIGS. 6A-6F, with reference to FIGS. 1 through 5B, illustrate a graphical representation of the hyper plane that comprises the plurality of support vectors according to an embodiment of the present disclosure. More particularly, FIGS. 6A-6F illustrate a graphical representation of the data sets of FIG. 5. Each of the data sets (e.g., data set 1, data set 2, data set 3, data set 4, data set 5, and data set 6) comprises one or more data points which are labelled either 1 or 0. The "diamond or rhombus" like structure indicate label 1 and the "-" indicates label 0. These labels further indicate a classification of one or more users into one or more categories.

Figure 7:
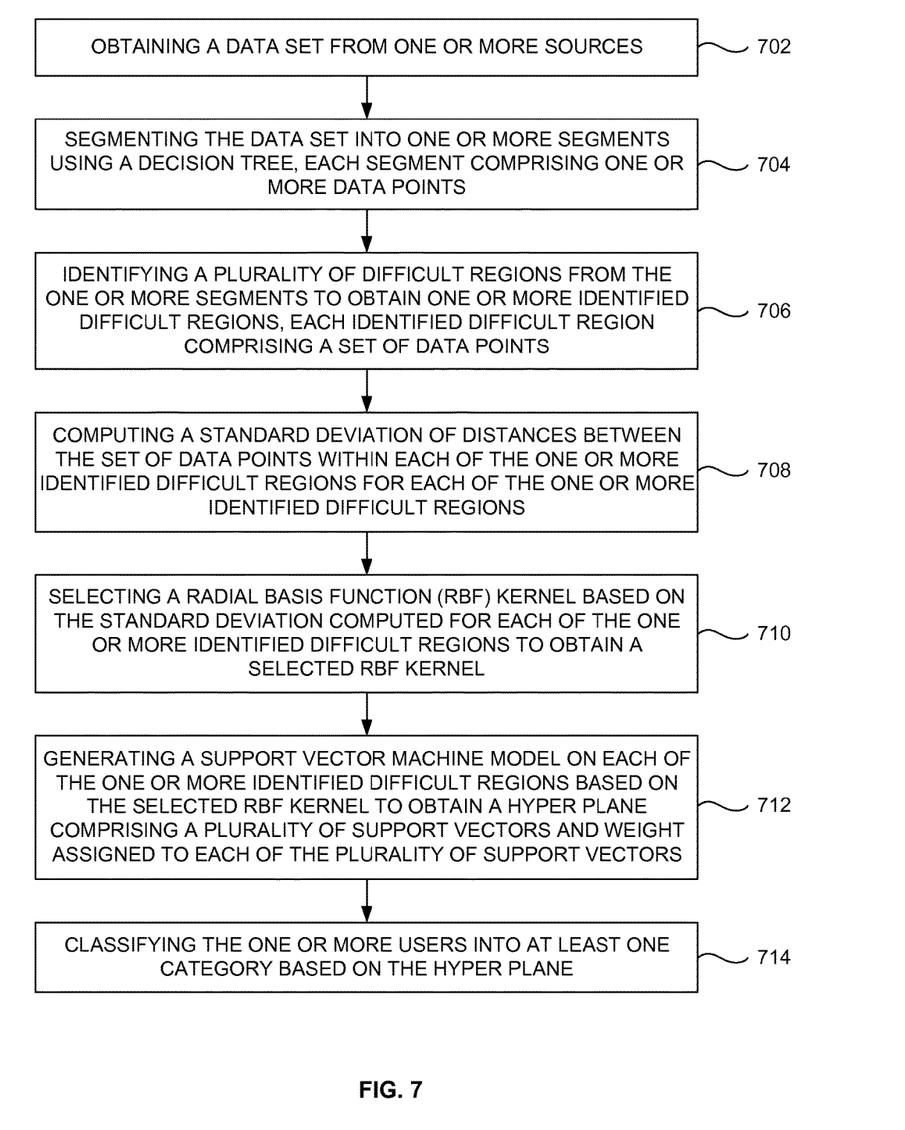
FIG. 7 is a flow diagram illustrating a computer implemented method for classifying one or more users according to an embodiment of the present disclosure.

FIG. 7, with reference to FIGS. 1 through 6F, is a flow diagram illustrating a computer implemented method for classifying one or more users according to an embodiment of the present disclosure. The method comprising obtaining (702), a data set from one or more sources, wherein the data set comprises information corresponding to one or more users; segmenting (704), using the segmentation module 108, the data set into one or more segments using a decision tree, each segment comprising one or more data points, wherein each data point is specific and unique to a user, and wherein the decision tree comprises one or more nodes, each node comprising at least one data point; identifying (706), a plurality of difficult regions from one or more segments to obtain one or more identified difficult regions, using the difficult region identification module 110, wherein each of the one or more identified difficult regions comprises a set of data points; computing (708), a standard deviation of distances between the set of data points within each of the one or more identified difficult regions for each of the one or more identified difficult regions, using the standard deviation computation module 112; selecting (710), a radial basis function (RBF) kernel based on the standard deviation computed for each of the one or more identified difficult regions to obtain a selected RBF kernel using the kernel selection module 114; generating (712), using the support vector machine generation module 116, a support vector machine model on each of the one or more identified difficult regions based on the selected RBF kernel to obtain a hyper plane comprising a plurality of support vectors and weight assigned to each of the plurality of support vectors; and classifying (714), using the classification module 118, the one or more users into at least one category based on the hyper plane.

Conventional methods use such as Grid or Tabular search for kernel selection over C different values of cost parameter, K different values of sigma of the RBF kernel using a N fold cross validation. This requires C*K*N different models to be built. Unlike conventional methods, the classification system 100 and the embodiments described herein in the proposed method, generate SVM models using only C*N factor, thus reducing the number of models by a big factor of 'K'.

In a preferred embodiment, the classification system 100 implements a decision trees which is allowed to grow until the data points at the leaf nodes can be used for training SVM models in reasonable time. The independent SVMs are then trained using a Map Reduce implementation of Cascade SVMs, in a preferred embodiment. When the decision surface is not linearly separable it is very time consuming task to choose an optimized kernel, which may involve several iterations of training the SVMs with various kernels and their various parameters. By using the decision trees, the dataset is segmented into one or more data points on which SVMs can be trained in a distributed fashion. Even after segments have been obtained the size of the training set could be still large. For example, when the training time lies between a first value (e.g., $O(n^2)$) and a second value (e.g., $O(n^3)$), SVMs are trained using RBF kernels on each of the segments in a distributed fashion using a Map Reduce implementation of Cascade SVMs. It is to be understood to a person having ordinary skill in the art that the training time need not necessarily lie between the first value and the second value. Thus, SVMs are trained using RBF Kernels even when the training time is lesser or greater than the first value and the second value. The advantages of using Cascade SVMs is it saves training time and also enables the classification system 100 to handle larger data sets which may not be possible on stand-alone systems. Thus, the training time for SVMs depends on a given parameter set (e.g., RBF Kernel's sigma value and cost Parameter) searching for the best hyper plane, and choosing good parameters for the SVM. The parameter set is selected by identifying only difficult regions for SVMs to be trained in a distributed fashion using Map Reduce implementation of Cascade SVMs, in a preferred embodiment. Using a heuristic method as described above, a RBF kernel's sigma value is chosen. In other words, the RBF kernel's sigma value is chosen by computing the standard deviation of distances between the set of data points within each of the one or more identified difficult regions for each of the one or more identified difficult regions.

The written description describes the subject matter herein to enable any person skilled in the art to make and use the embodiments of the invention. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

What is claimed is:

1. A computer implemented method for classifying one or more users, said computer implemented method comprising:

obtaining, by a hardware processor, a data set from one or more sources, wherein said data set comprises information corresponding to one or more users;

segmenting, by the hardware processor, said data set into one or more segments using a decision tree, each segment comprising one or more data points, wherein each data point is specific and unique to a user, and wherein said decision tree comprises one or more nodes, each node comprising at least one data point;

identifying, by the hardware processor, a plurality of difficult regions from said one or more segments to obtain one or more identified difficult regions, wherein each of said one or more identified difficult regions comprises a set of data points;

computing, by the hardware processor, a standard deviation of distances between said set of data points within each of said one or more identified difficult regions for each of said one or more identified difficult regions;

selecting, by the hardware processor, a radial basis function (RBF) kernel based on said standard deviation computed for each of said one or more identified difficult regions and a cost parameter associated with the RBF kernel;

generating, by the hardware processor, a support vector machine model on each of said one or more identified difficult regions based on said selected RBF kernel to obtain a hyper plane comprising a plurality of support vectors and weight assigned to each of said plurality of support vectors, wherein the support vector machine model is generated based on said selected RBF kernel using a map reduce implementation of cascaded support vector machine models, wherein the plurality of support vectors are generated by using a random key-value pair for each of said set of data points within each of said one or more identified difficult regions; and classifying, by the hardware processor, said one or more users into at least one category based on said hyper plane.

2. The computer implemented method of claim 1, wherein said one or more difficult regions are identified based on a purity level and number of data points in at least one node of said decision tree.

3. The computer implemented method of claim 1, wherein said standard deviation is computed in accordance with an equation:

$$K(X_i, X) = \exp\left(-\frac{\|X_i - X_j\|^2}{2\sigma^2}\right),$$

wherein K(Xi, X) is a kernel function, wherein σ is a value in said RBF kernel, and where $X_i$ and $X_j$ are data points.

4. The computer implemented method of claim 3, wherein said hyper plane is obtained in accordance with an equation:

$$f(X) = \sum_{\{i \in \text{suppor vectors}\}} \alpha_i y_i K(X_i, X) + b,$$

where i ranges from 1 to n, where $\alpha_i$ is said weight assigned to each of said plurality of support vectors 'I ', and b is the bias.

5. The computer implemented method of claim 1, wherein said one or more sources is selected from a group comprising a telecommunication industry, a financial institution, a medical institution, and a retail industry.

6. The computer implemented method of claim 1, wherein said at least one category is selected from a group comprising a credit defaulter, a health disease, and a fraudulent detection.

7. A computer implemented system for classifying one or more users, said computer implemented system comprising:
a hardware processor;
a memory that stores instructions and a database, wherein said database comprising a data set obtained from one or more sources, wherein said data set comprises information corresponding to one or more users, and wherein said hardware processor is configured by said instructions to execute:

a segmentation module that segments said data set into one or more segments using a decision tree, each of said one or more segments comprising one or more data points, wherein each data point is specific and unique to a user, and wherein said decision tree comprises one or more nodes, each node comprising at least one data point;

a difficult region identification module that identifies a plurality of difficult regions from said one or more segments to obtain one or more identified difficult regions, wherein each of said one or more identified difficult regions comprises a set of data points;

a standard deviation computation module that computes a standard deviation of distances between said set of data points within each of said one or more identified difficult regions for each of said one or more identified difficult regions;

a radial basis function selection module that selects a radial basis function (RBF) kernel based on said standard deviation computed for each of said one or more identified difficult regions and a cost parameter associated with the RBF kernel;

a support vector machine model generation module that generates a support vector machine model on each of said one or more identified difficult regions based on said selected RBF kernel to obtain a hyper plane comprising a plurality of support vectors and weight assigned to each of said plurality of support vectors, wherein the support vector machine model is generated based on said selected RBF kernel using a map reduce implementation of cascaded support vector machine models, wherein the plurality of support vectors are generated by using a random key-value pair for each of said set of data points within each of said one or more identified difficult regions; and a classification module that classifies said one or more users into at least one category based on said hyper plane.

8. The computer implemented system of 7, wherein said one or more difficult regions are identified based on a purity level and number of data points in at least one node of said decision tree.

9. The computer implemented system of claim 7, wherein said standard deviation is computed in accordance with an equation:

$$K(X_i, X) = \exp\left(-\frac{\|X_i - X_j\|^2}{2\sigma^2}\right),$$

wherein K(Xi,X) is a kernel function, where σ is a value in said RBF kernel, and where $X_i$ and $X_j$ are data points.

10. The computer implemented system of claim 9, wherein said hyper plane is obtained in accordance with an equation:

$$f(X) = \sum_{\{i \in suppor\ vectors\}} \alpha_i y_i K(X_i, X) + b,$$

where i ranges from 1 to n, where $\alpha_i$ is said weight assigned to each of said plurality of support vectors 'i' and b is the bias.

11. One or more non-transitory machine readable information storage mediums comprising one or more instructions, which when executed by one or more hardware processors causes classifying one or more users by performing the step of:

obtaining a data set from one or more sources, wherein said data set comprises information corresponding to one or more users;

segmenting said data set into one or more segments using a decision tree, each segment comprising one or more data points, wherein each data point is specific and unique to a user, and wherein said decision tree comprises one or more nodes, each node comprising at least one data point;

identifying a plurality of difficult regions from said one or more segments to obtain one or more identified difficult regions, wherein each of said one or more identified difficult regions comprises a set of data points;

computing a standard deviation of distances between said set of data points within each of said one or more identified difficult regions for each of said one or more identified difficult regions;

selecting a radial basis function (RBF) kernel based on said standard deviation computed for each of said one or more identified difficult regions and a cost parameter associated with the RBF kernel;

generating a support vector machine model on each of said one or more identified difficult regions based on said selected RBF kernel to obtain a hyper plane comprising a plurality of support vectors and weight assigned to each of said plurality of support vectors, wherein the support vector machine model is generated based on said selected RBF kernel using a map reduce implementation of cascaded support vector machine models, wherein the plurality of support vectors are generated by using a random key-value pair for each of said set of data points within each of said one or more identified difficult regions; and classifying said one or more users into at least one category based on said hyper plan.

* * * * *

UNITED STATES PATENT AND TRADEMARK OFFICE
CERTIFICATE OF CORRECTION

| | | |
|---|---|---|
| PATENT NO. | : 10,181,102 B2 | Page 1 of 1 |
| APPLICATION NO. | : 14/602423 | |
| DATED | : January 15, 2019 | |
| INVENTOR(S) | : Hegde et al. | |

It is certified that error appears in the above-identified patent and that said Letters Patent is hereby corrected as shown below:

In the Specification

In Column 2, Line 10, delete "$K(X_i,X)$" and insert --$K(X_i, X)$-- therefor

In Column 8, Line 36, delete "120)." and insert --118).-- therefor

In Column 9, Line 23, delete "506" and insert --508-- therefor

In Column 9, Line 66, after "machine", insert --model--

In the Claims

In Column 11, Line 53, in Claim 3, delete "$K(Xi, X)$" and insert --$K(X_i, X)$-- therefor In Column 11, Line 53, in Claim 3, delete "σis" and insert --σ is-- therefor In Column 11, Line 64, in Claim 4, delete "'I ',and" and insert --'i', and-- therefor In Column 12, Line 55, in Claim 8, after "of", insert --claim--

In Column 12, Line 59, in Claim 9, delete "claim7," and insert --claim 7,-- therefor In Column 13, Line 1, in Claim 9, delete "$K(Xi,X)$" and insert --$K(X_i, X)$-- therefor In Column 13, Line 1, in Claim 9, delete "σis" and insert --σ is-- therefor In Column 13, Line 14, in Claim 10, delete "'i'and" and insert --'i', and-- therefor Signed and Sealed this
Twenty-first Day of April, 2020

Andrei Iancu
*Director of the United States Patent and Trademark Office*